United States Patent [19]
Endo et al.

[11] 3,881,142
[45] Apr. 29, 1975

[54] STABILIZED BRUSHLESS MOTOR DRIVE CIRCUIT

[76] Inventors: Takeshi Endo, 14-21, 1-chome, Sawamura, Matsumoto-shi, Nagano-ken; Yoshihiro Mitsui, 1192-1, Murai-machi, Yoshikawa, Matsumoto-shi, Nagano-ken; Hiroshi Kamakura, 7-17, 1-chome, Shiraita, Matsumoto-shi, Nagano-ken, all of Japan

[22] Filed: June 22, 1973

[21] Appl. No.: 372,564

[30] Foreign Application Priority Data
June 22, 1972 Japan.................. 47-61794

[52] U.S. Cl................... 318/138; 318/254
[51] Int. Cl. ............................. H02k 29/00
[58] Field of Search................ 318/138, 254

[56] References Cited
UNITED STATES PATENTS

| | | |
|---|---|---|
| 3,440,506 | 4/1969 | Krestel et al................ 318/254 X |
| 3,486,099 | 12/1969 | Brunner et al............... 318/254 |
| 3,716,769 | 2/1973 | Brunner...................... 318/254 |

*Primary Examiner*—G. Z. Rubinson
*Attorney, Agent, or Firm*—Blum, Moscovitz, Friedman & Kaplan

[57] ABSTRACT

A brushless motor drive circuit including at least one hall effect element to produce a signal to energize at least two drive coils, which coils operate to drive the brushless motor. The amplitude of the signal applied to said drive coils is determined by the current supplied to the hall effect element. A control circuit is provided for controlling said supplied current in response to the speed of the motor. The control circuit includes a single transistor coupled to said hall effect element, the series connection of a constant voltage produced by a voltage limiting device and a voltage representative of motor speed being coupled to the base of the transistor to bias the transistor to maintain a constant motor speed.

8 Claims, 3 Drawing Figures

STABILIZED BRUSHLESS MOTOR DRIVE CIRCUIT

BACKGROUND OF THE INVENTION

This invention relates generally to a drive circuit for a brushless motor, and in particular, to a control circuit for stabilizing the operation of a brushless motor drive circuit. A motor construction incorporating hall effect elements to detect the position of the rotor is depicted in U.S. application Ser. No. 280,705, of Yoshihiru Mitsui, and is incorporated by reference herein.

While control circuits comprised of several transistors for controlling the speed and operating characteristics of a brushless motor drive circuit have been provided, such control circuits have heretofore been less than completely satisfactory. Because it is difficult to determine the exact operating point of each transistor and because such inability is multiplied by the use of more than one transistor, the operating range of the control circuit is extremely limited. Moreover, it is increasingly difficult to maintain the stability of the drive circuit over a wide range of operating voltages in view of the variations in the voltage supplied by the power source. Accordingly, it is desirable to produce a brushless motor drive circuit which includes a control circuit formed of a single transistor and substantially immune to normal fluctuations in the supply voltage.

SUMMARY OF THE INVENTION

Generally speaking, in accordance with the invention, a brushless motor drive circuit is provided including at least one hall effect element for controlling the application of a driving signal to at least two driving coils, the amplitude of the driving signal being responsive to the current supplied to the hall effect element. A control circuit for stabilizing the operation of said driving circuit by controlling the current supplied to the hall effect element is provided. The control circuit includes a transistor coupled to the hall effect element, means for producing a substantially constant voltage, and means for detecting the speed of said motor and coupling a voltage proportional to said speed in series with said constant voltage and the base of said transistor for biasing said transistor so that the current supplied to the hall effect element is controlled to maintain the speed of the motor constant.

Accordingly, it is an object of this invention to provide an improved drive circuit for a brushless motor.

Another object of the instant invention is to provide an improved brushless motor drive circuit wherein improved speed control and high stability are effected thereby.

Still another object of this invention is to provide a brushless motor drive circuit which provides greater stability yet provides for easier assembly at less cost.

The invention accordingly comprises the features of construction, combination of elements, an arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
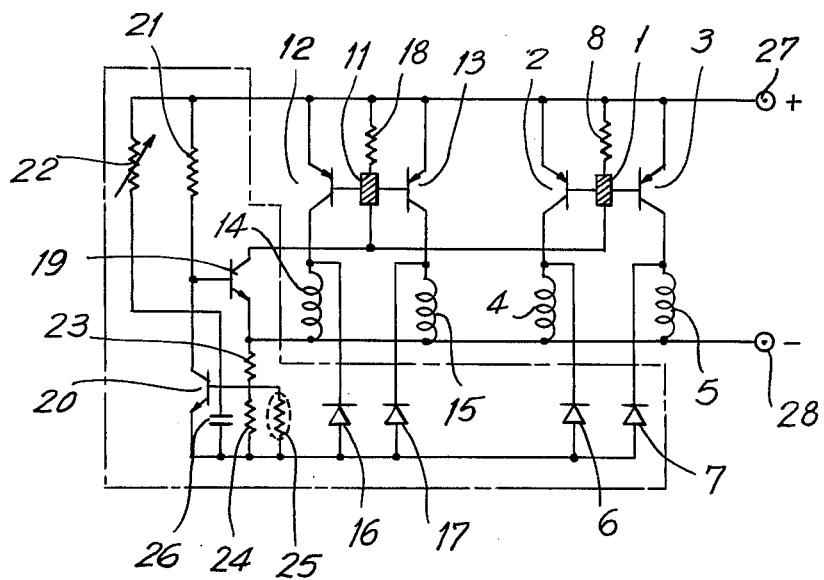
FIG. 1 is a circuit diagram of a conventional brushless motor drive circuit.

Referring to FIG. 1, the conventional brushless motor drive circuit depicted includes two hall effect elements for detecting the position of a rotor on a brushless motor by detecting the passage thereby of a permanent magnet and providing a signal in response to such detection. The hall effect elements may be formed of indium antimonide or the like. The output terminal of hall effect elements 1 and 11 are coupled to the respective base electrodes of driving transistors 2 and 3 and 12 and 13 respectively. Each of the driving transistors 2, 3, 12 and 13 have their emitter electrodes coupled to the positive terminal 27 of a power source (not shown) and further have their collector electrodes coupled to driving coils 4, 5, 14 and 15 respectively. The hall effect elements 1 and 11, which are respectively coupled to the positive terminal 27 of the power source through resistors 8 and 18, are further coupled to the collector electrode of a first control transistor 19. The first control transistor 19 has its emitter electrode coupled to a negative terminal 28 of said power source which also has coupled thereto driving coils 4, 5, 14 and 15. The base electrode of first control transistor 19 is coupled to the collector electrode of a second control transistor 20 and is further coupled to positive terminal 27 through a load resistor 21. The base electrode of the second control transistor 20 is coupled to the positive terminal of power source 27 by a variable resistor 22 and is further coupled to the emitter of first control transistor 19 by resistor 23. A resistor 24, a thermistor 25 and a capacitor 26 are coupled in parallel between the base electrode to second control transistor 20 and the commonly connected anodes of diodes 6, 7, 16 and 17. The cathodes of diodes 6, 7, 16 and 17 are respectively connected to the collector of one of transistors 2, 3, 12 and 13.

In operation a rotor formed with permanent magnets of a brushless motor (not shown) is driver by the field produced by the voltage applied to driving coils 4, 5, 14 and 15. As the rotor rotates each hall effect element detects the position of the permanent magnets and provides a signal to driving transistors 2, 3, 12 and 13 to apply a driving signal to the respective coil positioned to apply driving force to said rotor. Because the amplitude of the signals applied to the driving transistors is dependent upon the current supplied to the hall effect element it is necessary for the current supplied to the hall effect element to be controlled, if the rotational speed of the motor is to be held constant. The supply of current to the hall effect elements is regulated by controlling the input signal supplied to the base electrode of first control transistor 19. The voltage induced across the driving coils, which voltage is proportional to the speed of the motor, is detected by the diodes 6, 7, 16 and 17 connected thereto. Resistors 23 and 24 divide the voltage detected by diodes 6, 7, 16 and 17 and apply the divided voltage which has been rectified by capacitor 26 to the base of the second control transistor 20. The voltage at the base electrode of second drive transistor 20 is thus determined by the variable resistor 22, resistors 23 and 24, and the resistance of thermistor 25 which serves to compensate for ambient temperature deviations. The speed control voltage thus controls the bias of the second control transistor which in turn controls the current supplied to the base electrode of the first control transistor to thereby control the current permitted to flow into the hall effect elements 1 and 11.

It will be appreciated by the skilled artisan that because the main components of a conventional control circuit are a plurality of transistors, and because the operating characteristics of such transistors are somewhat unreliable, the use of more than one transistor provides a narrow range of reliability and hence a limited range of operation. Moreover, the thermistors used in the control circuit to compensate for the effect of temperature variations on the control circuit becomes less effective because of the use of a plurality of transistors. For example, where more than one transistor is involved changes in voltage $V_{BE}$ between the base and emitter, and current $I_{CBO}$ for interrupting the collector are involved, so that variations in operating characteristics with temperature are very large, and in the case of mass production, some transistors may be used which are not even affected by the temperature compensation thereof.

Figure 2:
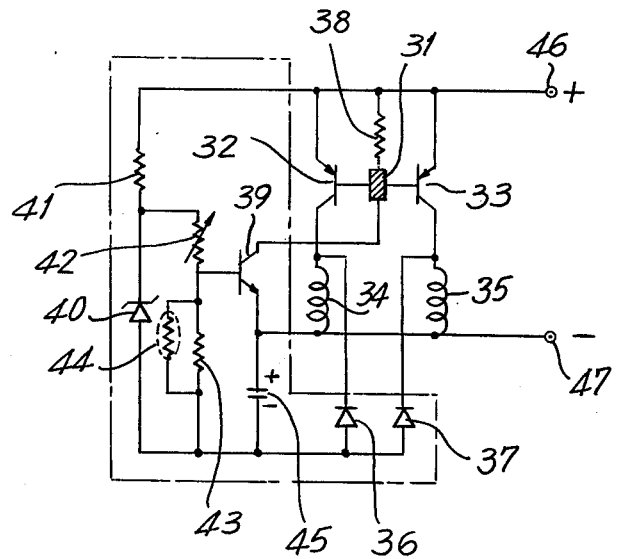
FIG. 2 is a circuit diagram of the brushless motor drive circuit constructed in accordance with the instant invention.

Referring now to FIG. 2 the control circuit is comprised of a single control transistor 39. As was depicted in FIG. 1, the driving circuit includes a hall effect element 31, drive transistors 32 and 33, and drive coils 34 and 35, which represent conventional elements in a brushless motor drive circuit as hereinabove described. The control transistor 39 is coupled at its collector electrode to hall effect element 31 to control the amount of current supplied thereto. The emitter electrode of the control transistor 39 is coupled to the negative terminal 47 of the power source which negative terminal is also coupled to one side of drive coils 34 and 35. Coupled to the other side of drive coils are diodes 36 and 37 for detecting the magnitude of the voltage induced across the drive coils, which magnitude represents the speed of the motor. The voltage induced across the diodes is smoothed and stored by capacitor 45, which capacitor is coupled to the emitter electrode of control transistor 39, and maintains the base electrode of the control transistor at a voltage, determined in part by the capacitor. Zener diode 40 is connected in series with load resistor 41 between capacitor 45 and positive terminal 46 and maintains a constant voltage across the divider circuit formed by variable resistor 42 and the parallel connection of thermistor 44 and resistor 43. The variable resistor 42 selects the proportion of the fixed voltage across zener diode 40 applied to the base of control transistor 39 and serves as a manual rotational speed control for the motor during operation.

In operation the control circuit will provide stable operation in the following manner. After a desired rotational speed is selected by setting variable resistor 42, the driving circuit sequentially applies a driving current to drive coils 34 and 35 which drives the motor. An induced voltage proportional to the rotor speed across drive coils 34 and 35 is detected by diodes 36 and 37 which cause capacitor 45 to be charged to that voltage. Because the zener diode is a constant voltage source, the voltage across the resistor 43 is held constant. The control transistor 39 is biased by the voltage difference between the voltage across resistor 43 and the voltage across capacitor 45. If the rotational speed of the brushless motor were to increase the voltage induced across the drive coils would likewise increase, thus, increasing the voltage across capacitor 45. Because the voltage across resistor 43 is constant, the base voltage of control transistor 39 is decreased to effect a reduction in the current supplied to the hall effect element. Similarly, if the speed is reduced, the voltage across the capacitor 45 would be reduced, thus increasing the base bias voltage of transistor 39 which would cause said control transistor 39 to effect an increase in the current supplied to hall effect element 31. Thus, since the main components of the control circuit is a single transistor and a zener diode, the operating point of the single transistor is more easily determined. Because the signal used to control the base electrode of the control transistor is determined by the difference between a fixed voltage and a voltage proportional to the rotational speed of the motor, the operating range of the transistor becomes effective over a broad range. Moreover, since the reference voltage across resistor 43 is held constant by the zener diode, the rotation of the motor is held constant in spite of variations in the power supplied thereto across terminals 46 and 47. Furthermore, increased stability is achieved with the further benefit of lower manufacturing costs and simplified and miniaturized assembly thereof.

Figure 3:
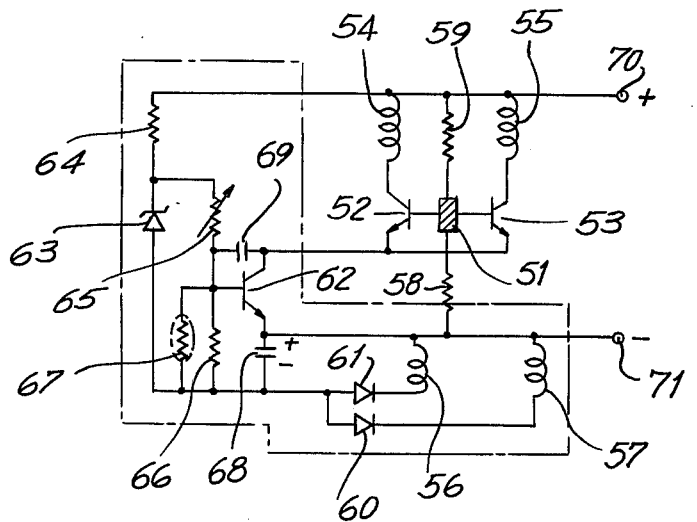
FIG. 3 is a circuit diagram of an alternate embodiment constructed in accordance with the instant invention.

An alternate embodiment of the present invention is illustrated in FIG. 3. Hall effect element 51 is included in a conventional driving circuit comprised of driving transistors 52 and 53 and driving coils 54 and 55. Resistors 58 and 59 are coupled between the hall effect element and the power supply to thereby control the current supplied thereto. The control circuit is comprised of a single control transistor 62 which has its collector electrode coupled to the emitter electrodes of driving transistors 52 and 53. The emitter electrode of control transistor 62 is coupled to the negative terminal 71 of the power supply and is further coupled through capacitor 68 to diodes 61 and 60. Diodes 61 and 60 are coupled to detecting coils 56 and 57, positioned adjacent permanent magnets on said rotor for detecting the speed of rotation of said rotor. The voltage induced in the detecting coils 56 and 57 is detected by diodes 60 and 61 and smoothed and stored in capacitor 68 connected between the emitter electrode of control transistor 62 and said diodes. A reference voltage arrangement consisting of zener diode 63, load resistor 64, variable resistor 65, resistor 66 and thermistor 67 is provided corresponding in structure and function to corresponding elements in the circuit of FIG. 2. An additional capacitor 69 is coupled between the collector electrode and the base electrode of transistor 62 for preventing oscillations in the control circuit.

In operation if the motor speed is increased, the voltage across capacitor 68 is increased due to the increased voltage induced in coils 56 and 57. Since the voltage across zener diode 63 remains constant, the voltage biasing the control transistor 62, obtained by the difference between the voltage across resistor 66 and the voltage across the capacitor 68, is decreased. Accordingly, the current supplied to the driving coils 54 and 55 will be coincidentally reduced and the rotational speed of the motor brought to the desired level. The reverse occurs if a lesser voltage is induced in the detecting coils due to a decrease in speed. Thus, improved stability, greater control, and a simplified, less expensive control circuit is thereby provided.

It is understood that although the driving circuit is shown using one hall effect element, driving circuits in accordance with the instant invention can include any number of such elements. Furthermore, both NPN and PNP control transistors can be used.

It will thus be seen in the objects set forth above among those made apparent from the preceding description, are efficiently attained and, since certain changes may be made in the above construction without departing from the spirit and scope of the invention, it is intended that all matter contained in the above description as shown in the accompanying drawings shall be interpreted as illustrative and not in a limiting sense.

It is also to be understood that the following claims are intended to cover all of the generic and specific features of the inventions herein described, and all statements of the scope of the invention which, as a matter of language, might be said to fall therebetween.

What is claimed is:

1. In a brushless motor circuit having at least one hall effect element for controlling the duration of application of driving current to a driving coil, the amplitude of said driving current being responsive to the current supplied to said hall effect element, the improvement which comprises control transistor means connected by its emitter-collector path to said hall effect element to control the amplitude of the current supplied to said hall effect element; means for detecting a voltage proportional to the rotational speed of said brushless motor; and means for producing a fixed reference voltage, means connecting said fixed reference voltage and said voltage proportional to the rotational speed of said rotor in series to the base of said control transistor means for linearly controlling the amplitude of the current applied to said hall effect element in response to variations in the voltage proportional to the rotational speed of said motor to maintain said speed at a predetermined level.

2. A brushless motor drive circuit as recited in claim 1, wherein said means for producing said fixed reference voltage includes zener diode means.

3. A brushless motor drive circuit as recited in claim 2, wherein said means for producing said fixed reference voltage includes voltage divider means including a fixed resistor and a variable resistor connected in series, said voltage divider means being connected in parallel with said zener diode means, said fixed resistor being connected in series with the base of said control transistor means and said voltage proportional to the speed of said motor.

4. A brushless motor drive circuit as recited in claim 3, including temperature compensating means connected in parallel with said fixed resistor.

5. A brushless motor drive circuit as recited in claim 3, wherein said means for detecting a voltage proportional to said rotor speed includes capacitor means for storing said voltage connected in series with said fixed resistor.

6. A brushless motor drive circuit as recited in claim 5, wherein said means for detecting a voltage proportional to the speed of said motor includes diode means connecting said capacitor and said driving coil for detecting the voltage induced therein.

7. A brushless motor drive circuit as recited in claim 5, wherein said means for detecting a voltage proportional to the speed of said motor includes detecting coil means and diode means connecting said detecting coil means and said capacitor.

8. A brushless motor circuit as claimed in claim 1, wherein said control transistor means comprises a single transistor.

* * * * *